Feb. 6, 1940.                M. L. MASTELLER                2,188,913
                              HYDRAULIC BRAKE
                           Filed Oct. 9, 1936           2 Sheets-Sheet 1
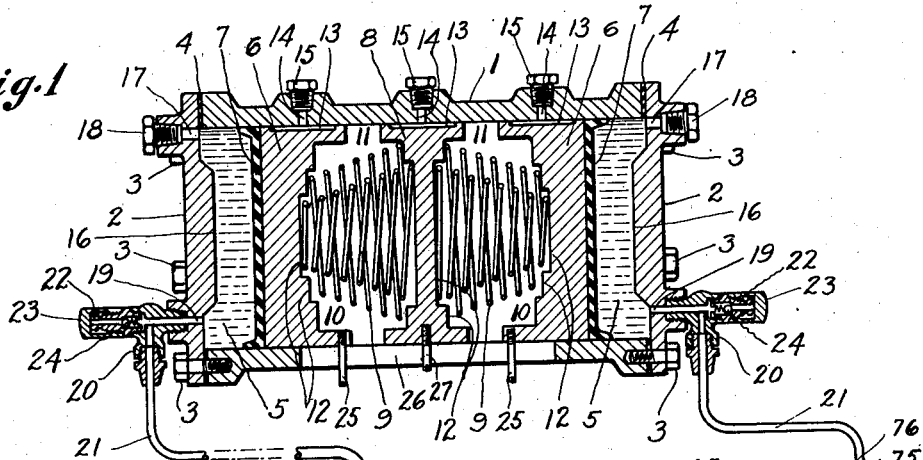
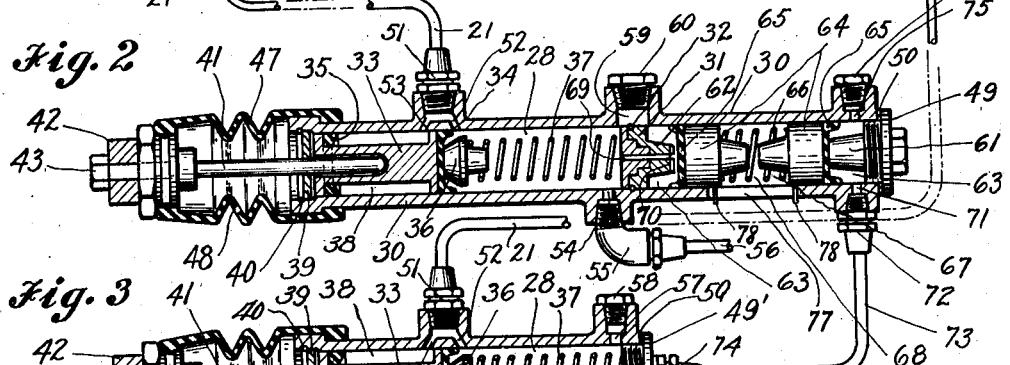
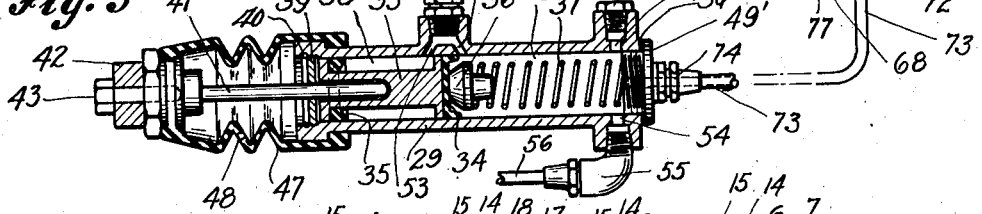
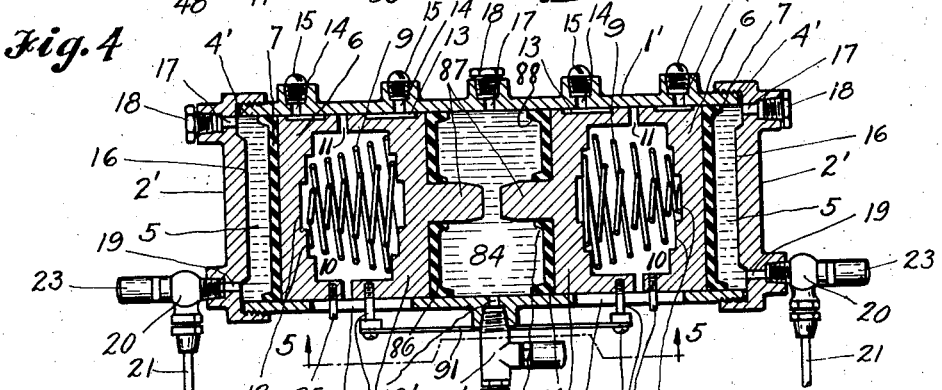
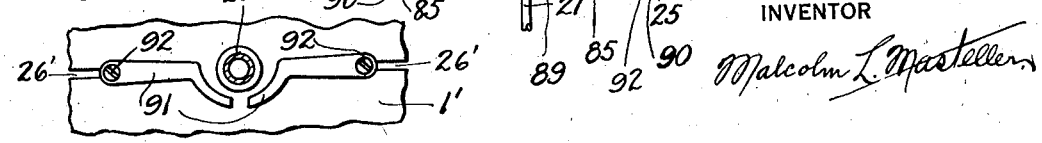
INVENTOR
Malcolm L. Masteller Feb. 6, 1940.  M. L. MASTELLER  2,188,913
HYDRAULIC BRAKE
Filed Oct. 9, 1936  2 Sheets-Sheet 2
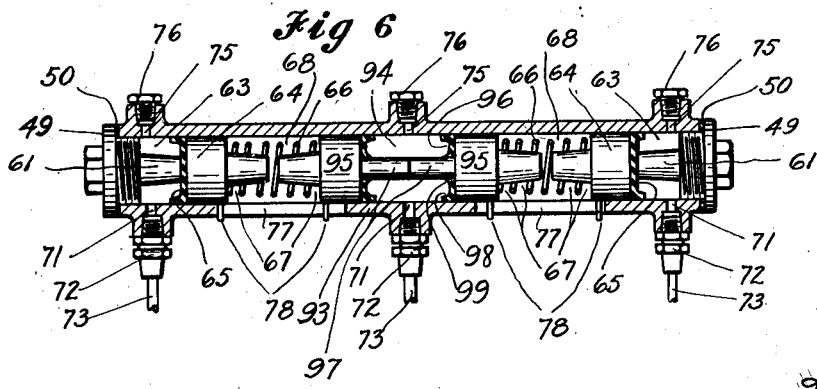
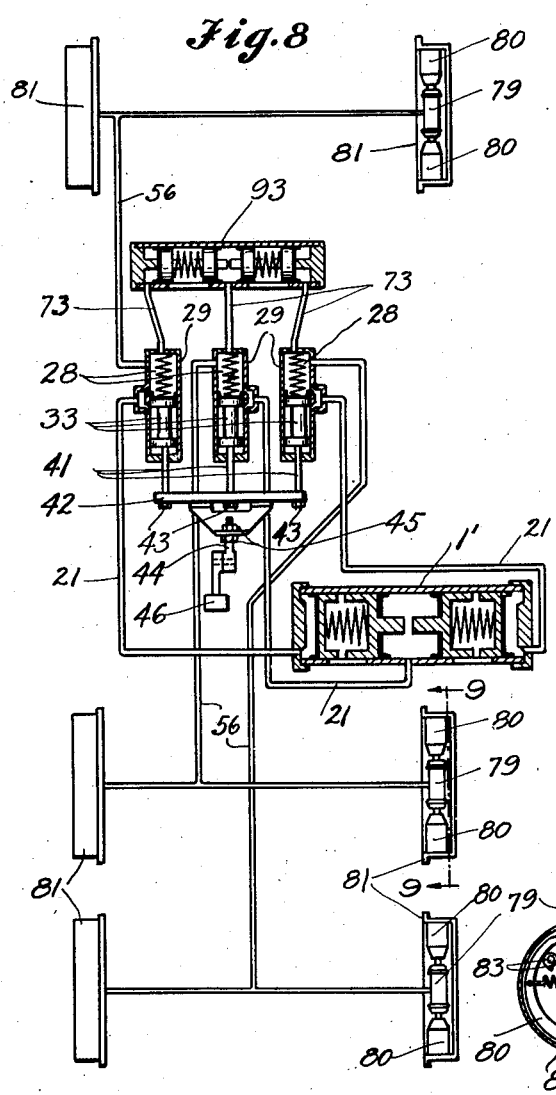
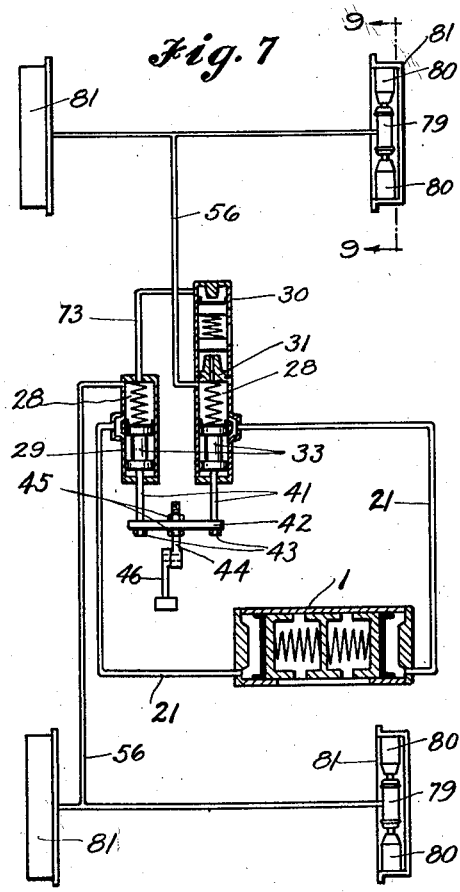
INVENTOR
Malcolm L. Masteller Patented Feb. 6, 1940

2,188,913

UNITED STATES PATENT OFFICE 2,188,913

HYDRAULIC BRAKE

Malcolm L. Masteller, Miami, Fla.

Application October 9, 1936, Serial No. 104,851

18 Claims. (Cl. 60—54.5)

This invention relates to improvements in hydraulic brake apparatus and the objects of the improvement are, first, to provide means in systems comprising a plurality of cooperating hydraulic systems, as one in conjunction with the braking means corresponding to each pair of braking wheels of a vehicle or train, for storing the liquid supply under equalized pressure in a plurality of separate compartments, each associated with and forming a part of one of the several hydraulic systems and being resiliently expansible and contractible for self adaptation to the quantity of liquid stored therein and variations in its volume due to changes in temperature, the device delivering the stored liquid to the lines as required and normally maintaining an equalized pressure, in the off brakes condition, throughout the system; all in such manner that the failure of one or more of said hydraulic systems will not incapacitate the rest. Second, to provide means for equalizing the pressures built up in plural hydraulic systems during the braking operations, comprising reciprocating members with definitely fixed ranges corresponding respectively to each compensating movement, all in such manner that the failure of one or more of said hydraulic systems will not incapacitate the rest. Third, to provide means for maintaining a normal slight pressure throughout an hydraulic system, for the following purposes: (a) to act upon the piston packing cups to keep them in proper shape and prime condition, with their lips always spread snugly against the cylinder walls; (b) to prevent the intake of air into the hydraulic system, by reason of the constant outward pressure; (c) to render the system more readily operable. In conventional hydraulic braking systems a normal minimum pressure is maintained in the wheel cylinders by means of check valves in the lines which prevent the return movement of the liquid when the pressure subsides to a predetermined degree I am aware that various devices have been attempted for extending this constant slight pressure practice to include master cylinders and reservoirs, said devices including a reservoir comprising a cylinder, a piston therein and a compression spring acting upon said piston and, through it, upon the operating liquid. In the latter case the purposes sought have been defeated of accomplishment by a too great fluctuation of pressure as between full and almost empty conditions, there being either too little on one hand or, on the other, so much as to partially apply the brakes.

I attain these objects by mechanism illustrated in the accompanying drawings, in which—

Figure 1 is a vertical section of the device as applicable to storing the liquid supply for dual hydraulic systems.

Figure 2 is a vertical section of one of the master cylinders, including the braking pressure equalizing means as applicable to dual hydraulic systems.

Figure 3 is a vertical section of one of the master cylinders without the equalizing means.

Figure 4 is a vertical section of the device as applicable to storing the liquid supply for triple hydraulic systems.

Figure 5 is a fragmentary view taken on the line 5—5 of Figure 4.

Figure 6 is a vertical section of the device as applicable to equalizing the braking pressures in triple hydraulic systems.

Figure 7 is a diagrammatic plan view showing the invention as applied to the separate braking of front and rear wheels respectively of a vehicle.

Figure 8 is a diagrammatic plan view showing the invention as applied to the separate braking of three pairs of wheels respectively of a three axled vehicle.

Figure 9 is a vertical section of brake drum taken on the line 9—9 of Figures 7 and 8, showing brake shoes and their associated parts.

I will first describe the device as applicable to storing the liquid supply under equalized pressure for dual hydraulic systems, each having its own compressor means, as for the separate operation of the brakes of front and rear wheels respectively of a vehicle. See Figure 1. Casing 1 and its heads 2, attached by means of screws 3, and drawn up on gaskets 4, form a reservoir, which is divided into two liquid containing compartments 5 by an assembly comprising a pair or inversely disposed pistons 6 with their packing cups 7, a third piston 8 disposed between them, and a plurality of compression springs 9. Compression springs 9 cooperate to urge pistons 6 in opposite directions to the full extent of their respective ranges and still act upon them with a predetermined pressure; piston 8 serves only as a seat and bearing for compression springs 9, thereby minimizing the tendency to weave which would be present in a single spring of the required dimensions.

Pistons 6—8 have chambered recesses 10 enlarging compartments 11 between them for the better accommodation of compression springs 9, thereby minimizing the length of the apparatus, said recesses being formed with shoulders 12 for holding compression springs 9 in a central position. They may also have recesses 13 to facilitate their lubrication with the operating liquid, or other suitable lubricant such as a component thereof, introduced through ports 14 in casing 1, which are closed by plugs 15.

Heads 2 are formed with bosses 16 for piston stops and are provided with bleeder vents 17 and plugs 18, also with ports 19, and fittings 20 adapted for connecting conduits 21 leading to the master cylinders. Fittings 20 also carry the filler means which comprises nozzle 22 adapted for engagement with a pressure gun, cover cap 23 and check valve 24.

When the operating liquid is forced into compartments 5 the pistons 6 recede against the resistance of compression springs 9. The length of each of pistons 6 is somewhat greater than that of its range, enabling it to carry stud 25 projecting through slot 26 in casing 1 for indicating exteriorally the position of the piston and consequently the quantity of liquid contained in the corresponding compartment 5. Stud 27 carried by piston 8 serves to hold said piston from turning around, thereby keeping its recess 13 in proper relation to the respective port 14 in casing 1. Slot 26 also provides breather means between compartments 11 and the atmosphere for compensation of the changing positions of pistons 6—8.

Compensation for variations in the volume of liquid due to changes in temperature is had from the resiliently expansible and contractible nature of compartments 5. It is therefore not intended that they should be filled to their utmost capacity but that a small margin should be left to provide for this. Any air present in them is automatically expelled when bleeder vents 17 are opened by slacking away plugs 18.

As an equalized pressure maintaining plural reservoir means, as above described, the device should be proportioned to a large diameter as related to its length in order to provide suitable storage capacity with short piston ranges, thereby minimizing the differential of spring tension as between full and almost empty conditions. To adequately accomplish this purpose the piston diameter must be greater than the length of the piston range. With this novel proportioning of the parts the stored liquid has a relatively large area in contact with the piston, thereby increasing the duty required of the resilient means to a point where, as in the dual system reservoir illustrated in Figure 1, if a single compression spring were used between pistons 6—6 it would be required to have such dimensions that it would weave and buckle; therefore a plurality of cooperating compression springs is made use of; they may be disposed in tandem with an additional member interposed between them having a bearing upon the cylinder wall, and/or they may be disposed one within the other. See Figures 1 and 7.

I will now describe the master cylinder assembly as illustrated in Figures 2 and 3. It may facilitate a more ready understanding of the description if I first state that these devices are preferably mounted side by side as shown in Figures 7 and 8.

The dual master cylinder assembly comprises compressor cylinders 28, each corresponding to one of said dual hydraulic systems; casings 29—30 enclosing said compressor cylinders; a prolongation of casing 30 for enclosing the equalizing means as hereinafter described; partition member 31 dividing the respective compressor cylinder from that corresponding to said equalizing means, said partition member being formed of male and female parts pressed together over retaining spring 32 which is accommodated within cooperating annular recesses in said partition member and casing 30; compressor pistons 33 with their primary packing cups 34 and secondary packing cups 35, spring seats 36, and compression springs 37 for normally holding said compressor pistons at the outer limits of their respective ranges; annular chambers 38 formed between said compressor pistons and the walls of said casings; end washers 39 which are held against annular shoulders in casings 29—30 by retaining springs 40 which in turn are held in annular recesses in casings 29—30 by their own resilience; plungers 41 for advancing said compressor pistons; and (referring also to Figure 7) cross head 42 attached to said plungers by means of screw bolts 43, rod 44 having adjustable threaded engagement with said cross head, nuts 45 for locking and bracing said engagement, and manual actuating means 46, common to both of said compressor pistons; boots 47 having breather ports 48; heads 49—49' enclosing the ends of casings 29—30, with which they have threaded engagement for drawing them up on gaskets 50; fittings 51 for connecting conduits 21 leading from the supply means; inlet ports 52 by means of which the liquid enters said compressor cylinders, said ports being very small and disposed adjacent to the respective compressor pistons 33 and immediately in advance of them when in their off brakes positions, in such manner that the respective compressor pistons, advancing in unison, will intercept said ports simultaneously as soon as they begin their forward movement, constituting valve means for closing off said supply means during each braking operation; ports 53 associating the supply means with said annular chambers 38 for filling said chambers with the operating liquid and expelling air therefrom, thereby forming a liquid seal for preventing loss of liquid around said compressor pistons after the lips of their primary packing cups have passed ports 52; outlet ports 54 with their fittings 55 for connecting conduits 56 leading to the brake actuating motors; compressor cylinder bleeder vent 57 in casing 29, with its plug 58; bleeder vent 59 in casing 30, with its plug 60, serving the respective compressor cylinder and also a compartment of the equalizing means, and disposed to facilitate the removal of partition member 31 if desired; and the dual hydraulic system braking pressure equalizing means which in this form comprises the aforesaid prolongation of casing 30, the aforesaid head 49 which is formed with boss 61 constituting a piston stop; the aforesaid partition member 31 which is likewise formed with boss 62 constituting a piston stop; all forming a chamber which is divided into two liquid containing compartments 63 by an assembly comprising a pair of inversely disposed pistons 64 with their packing cups 65, and compression spring 66, the latter urging pistons 64 in opposite directions to the full extent of their ranges and still acting upon them with a pressure greater than the off brakes hydraulic pressure normally acting upon the other ends of said pistons.

Pistons 64 have annular recesses 67 enlarging compartment 68 between them for the accommodation of compression spring 66, thereby enabling pistons 64 to contact each other.

Compartments 63 are provided with means for associating each of them with one of the dual hydraulic systems in such manner that it form a part thereof. In one instance this consists of orifice 69 in partition member 31 and groove 70 across the face of its boss 62, directly connecting the corresponding compartment 63 with one of compressor cylinders 28; in the other instance it comprises port 71 in casing 30, fitting 72, conduit 73 leading to the other of compressor cylinders 28, and fitting 74 for connecting it thereto, it being conveniently attached to head 49' which is provided with a port therefor. Compartments 63 are also provided with bleeder vents 75—59 and plugs 76—60. Compartment 68 is provided with slot 77 in casing 30 constituting breather means for compensating the changing positions of pistons 64, which may also carry studs 78 for exteriorly indicating their movement.

In the operation of the brakes compressor pistons 33 are advanced in unison (see Fig. 7), displacing liquid in equal volume from each of compressor cylinders 28. It flows through conduits 56 into fluid motors 79, which, actuated by said liquid, move brake shoes 80 into engagement with their respective drums 81 against the resistance of extension springs 82 (see Fig. 9) which normally hold said brake shoes against adjustable stops 83 which are rigidly mounted in relation thereto.

Differentials in the quantity of liquid required to operate the braking units of front and rear wheels respectively are compensated in the following manner: When the braking pressures are applied in the hydraulic systems, pistons 64 are forced backward against the resistance of compression spring 66 until they engage each other when they maintain an equilibrium between the dual hydraulic systems. When all brake shoes corresponding to one of the braking axles have been brought into engagement with their respective drums, those corresponding to the other braking axle not yet having been brought into such engagement, a further forward movement of compressor pistons 33 causes a compensating movement of pistons 64 so that, after their mutual engagement has been established, both compressor cylinders contribute to supply the line which is deficient and bring up all of said brake shoes into equal braking engagement, said pistons 64 operating just as would a single piston but with the advantage that having started from fixed positions they assure positively defined ranges corresponding respectively to each compensating movement, also with the advantage that the single compression spring 66 causes pistons 64 to resist equally the liquid of each of said hydraulic systems. Moreover, in the event of failure of one of said hydraulic systems during a braking operation, piston 64 corresponding to the remaining hydraulic system will nevertheless be returned immediately upon release of the brakes to its normal position, restoring to the compresor cylinder of said remaining hydraulic system the full amount of liquid taken from it, preventing a depression therein, and thereby facilitating the return of the respective compressor piston 33 to its normal off brakes position, which is essential to the reestablishment of communication between the operating means and supply means of said remaining hydraulic system.

The range of pistons 64 is limited to a suitable conservation of the operating liquid corresponding to the remaining hydraulic system in the event of failure of the other one.

When the braking pressures are released the entire system returns to its normal off brakes condition, actuated primarily by a corresponding movement of the operating liquid, which is set in motion by the retractile force of extension springs 82, secondarily by compression springs 37—66.

I will now describe the device as applicable to storing the liquid supply under equalized pressure for triple hydraulic systems, each having its own compressor means, as for the separate operation of the brakes corresponding respectively to three pairs of wheels. See Figs. 4 and 5. In this form the device comprises casing 1' and its heads 2' drawn up, by means of threaded engagement, on gaskets 4'; two liquid containing compartments 5 and a third liquid containing compartment 84, separated by two similar assemblies, each comprising a pair of inversely disposed pistons 6—85 with their packing cups 7—86, and one or more compression springs 9. Pistons 85 and packing cups 86 differ from the others in that these pistons must carry their own stops. Therefore, pistons 85 are formed with a boss 87 which projects through a central aperture in packing cups 86, the latter being of the double flange variety, flange 88 engaging casing 1' and flange 89 engaging boss 87.

Compression springs 9 cooperate to urge pistons 6—85 in opposite directions to the full extent of their respective ranges and still act upon them with a predetermined pressure.

Pistons 6—85 have chambered recesses 10 enlarging compartments 11 between them for the better accommodation of compression springs 9, thereby minimizing the length of the apparatus, said recesses being formed with shoulders 12 for holding compression springs 9 in a central position. They may also have recesses 13 to facilitate their lubrication with the operating liquid, or other suitable lubricant such as a component thereof, introduced through ports 14 in casing 1' which are closed by plugs 15.

Heads 2' are formed with bosses 16 for piston stops and are provided with bleeder vents 17 and plugs 18, also with ports 19 and fittings 20 adapted for connecting conduits 21 leading to the master cylinders. Pistons 85 are adapted to engage each other, and their stops 87 must be of a length proportioned to a suitable separation of packing cups 86 to the end that their flanges 88 cannot foul the respective bleeder vent 17, which with its plug 18 is positioned in the upper central portion of casing 1', or port 19' leading to fitting 20' adapted for connecting conduit 21 leading to the added compressor cylinder, even under the extreme condition pertaining with compartment 84 and one of compartments 5 empty and the other of compartments 5 completely full of the operating liquid. Fittings 20—20' also carry the filler means as hereinbefore described.

The length of each of pistons 6 is somewhat greater than its range, enabling it to carry stud 25 projecting through the respective slot 26' in casing 1' for indicating exteriorly the position of the piston and consequently the quantity of liquid contained in the corresponding compartment 5. Pistons 85 are also proportioned to enable them to carry studs 90 projecting through slots 26' in casing 1', together with stems 91 attached by means of screws 92, for indicating exteriorly the separation between the bosses 87 and consequently the quantity of available liquid in compartment 84. Slots 26' also provide breather means between compartments 11 and the atmosphere for compensation of the changing positions of pistons 6—85.

The master cylinder assembly as applicable to triple hydraulic systems comprises three of the compressor units illustrated in Figure 3, the organization of which, together with the equalized supply means and the braking pressure equalizing means, is illustrated in Figure 8 to which I now refer. There are three plungers 41 for advancing the compressor pistons; cross head 42, attached to said plungers by means of screw bolts 43; rod 44 having adjustable threaded engagement with said cross head, and nuts 45 for locking and bracing said engagement; and manual actuating means 46, common to all of said compressor pistons. There are three conduits 73 leading to the triple hydraulic system braking pressure equalizing means generally referred to in Figure 8 by the number 93, and illustrated in detail in Figure 6 to which I now refer. It comprises casing 93 with its heads 49, formed with bosses 61 for piston stops and drawn up, by means of threaded engagement with said casing, on gaskets 50; two liquid containing compartments 63 and a third liquid containing compartment 94, separated by two similar assemblies, each comprising a pair of inversely disposed pistons 64—95 with their packing cups 65—96 and a compression spring 66. Compression springs 66 cooperate to urge pistons 64—95 in opposite directions to the full extent of their ranges and still act upon them with a pressure greater than the off brakes hydraulic pressure normally acting upon the other ends of said pistons.

Pistons 95 and packing cups 96 differ from the others in that these pistons must carry their own stops. Therefore, pistons 95 are formed with a boss 97 which projects through a central aperture in packing cups 96, the latter being of the double flange variety, flange 98 engaging casing 93 and flange 99 engaging boss 97.

Pistons 64—95 have annular recesses 67 enlarging compartments 68 between them for the accommodation of compression springs 66 thereby enabling pistons 64—95 to contact each other.

Compartments 63—94 have ports 71 in casing 93, and fittings 72 adapted for connecting conduits 73 leading from each of the several compressor cylinders 28 (see Fig. 8), by means of which compartments 63—94 are each associated with one of said triple hydraulic systems in such manner that it forms a part thereof. Each of compartments 63—94 is also provided with a bleeder vent 75 and plug 76. Compartments 68 are provided with slots 77 in casing 93 constituting breather means for compensating the changing positions of pistons 64—95, which may also carry studs 78 for exteriorly indicating their movement.

In the operation of the brakes (see Fig. 8), compressor pistons 33 are advanced in unison, displacing liquid in equal volume from each of compressor cylinders 28. It flows through conduits 56 into fluid motors 79, which, arcuated thereby, move brake shoes 80 into engagement with their respective drums 81 against the resistance of extension springs 82 (see Fig. 9) which normally hold said brake shoes against adjustable stops 83 which are rigidly mounted in relation thereto.

Differentials in the quantity of liquid required to operate the braking units corresponding respectively to each pair of wheels is compensated in the following manner (see Figs. 6 and 8): When the braking pressures are applied in the hydraulic systems, pistons 64—95 are forced into engagement with each other, against the resistance of compression springs 66; they then maintain an equilibrium in the several hydraulic systems in their relation to each other. When all brake shoes corresponding to one pair of wheels have been brought into engagement with their respective drums, those corresponding to the other pairs of wheels not yet having been brought into such engagement, a further forward movement of compressor pistons 33 causes a compensating movement of said pistons 64—95, all of said compressor cylinders contributing to further advance the brake shoes still to be brought up, and so on successively until all of said brake shoes have made equal braking engagement. The ranges of pistons 64—95 are limited to a suitable conservation of the operating liquid in the event of failure of one or even two of said hydraulic systems.

When the braking pressures are released the entire system returns to its normal off brakes condition, as hereinbefore explained together with other operating features common to both dual and triple installations.

What I claim is:

1. In a brake having a plurality of hydraulic systems; means for equalizing the pressures therein, comprising a casing and a chamber therein; a plurality of reciprocating members in said chamber, each of said reciprocating members having the effect of closing off a liquid containing compartment; means for associating each of said liquid containing compartments with one of said hydraulic systems in such manner that it form a part thereof, each of said reciprocating members having one face in contact with the operating liquid in one of said hydraulic systems; and resilient means, common to all, acting upon the other side of each of said reciprocating members.

2. In a brake having a plurality of hydraulic systems; means for equalizing the pressures therein, comprising a casing and a chamber therein; a plurality of reciprocating members in said chamber, each of said reciprocating members having the effect of closing off a liquid containing compartment; means for associating each of said liquid containing compartments with one of said hydraulic systems in such manner that it form a part thereof, each of said reciprocating members having one face in contact with the operating liquid in one of said hydraulic systems; resilient means, common to all, acting upon the other side of each of said reciprocating members; and engageable means limiting the ranges of said reciprocating members.

3. A pressure equalizing device as set forth in claim 2 in which said engageable means includes said reciprocating members engaging each other.

4. In a brake having a plurality of hydraulic systems, each having its own pressure creating means and valve means associated therewith for closing off the reservoir means during each braking operation; an equalized pressure maintaining reservoir means, self adapting to the quantity of liquid stored therein and variations in its volume due to changes in temperature, comprising a plurality of reservoir compartments; means for associating one of said compartments with each hydraulic system in such manner that it normally form a part thereof; a plurality of reciprocating members, each disposed with one side engaging the operating liquid in one of said compartments; and resilient means, common to all, acting upon the other side of each of said reciprocating members.

5. In a brake having a plurality of hydraulic systems; means for equalizing the braking pressures therein, comprising a casing and a chamber therein; a plurality of reciprocating members in said chamber, each of said reciprocating members having the effect of closing off a liquid containing a compartment; means for associating each of said liquid containing compartments with one of said hydraulic systems in such manner that it form a part thereof, each of said reciprocating members having one side exposed to the action of the liquid in one of said hydraulic systems; engageable means limiting the ranges of said reciprocating members, including engagement of said reciprocating members with each other; and resilient means, common to all, acting upon the other side of each of said reciprocating members with sufficient force to overcome the off brakes hydraulic pressure and normally maintain said reciprocating members seated upon the engageable means at the outer limits of their ranges, in relation to said resilient means.

6. In a brake having a plurality of hydraulic systems; a device in combination therewith comprising a chamber divided into a plurality of expansible and contractible compartments by a plurality of reciprocating members; means for making a plurality of said compartments fluid tight; means for associating one of said fluid tight compartments with each hydraulic system in such manner that it form a part thereof; and resilient means, common to all, urging said reciprocating members to contract said fluid tight compartments.

7. In a brake having a plurality of hydraulic systems; a device in combination therewith comprising a chamber divided into a plurality of expansible and contractible compartments by a plurality of reciprocating members; means for making a plurality of said compartments fluid tight; means for associating one of said fluid tight compartments with each hydraulic system in such manner that it form a part thereof; and resilient means, common to all, urging said reciprocating members to contract said fluid tight compartments, said resilient means being disposed in relation to said reciprocating members so that said reciprocating members can contact each other.

8. In a brake having a plurality of hydraulic systems; a device in combination therewith comprising a chamber divided into a plurality of expansible and contractible compartments by a plurality of reciprocating members; means for making a plurality of said compartments fluid tight; means for associating one of said fluid tight compartments with each hydraulic system in such manner that it form a part thereof; resilient means, common to all, urging said reciprocating members to contract said fluid tight compartments; and engageable means limiting the ranges of said reciprocating members.

9. In a brake having a plurality of hydraulic systems; a device in combination therewith comprising a chamber divided into a plurality of expansible and contractible compartments by a plurality of reciprocating members; means for making a plurality of said compartments fluid tight; means for associating one of said fluid tight compartments with each hydraulic system in such manner that it form a part thereof; resilient means, common to all, urging said reciprocating members to contract said fluid tight compartments; and engageable means limiting the ranges of said reciprocating members, including engagement of said reciprocating members with each other.

10. In a brake having a plurality of hydraulic systems; a device in combination therewith comprising a chamber divided into a plurality of expansible and contractible compartments by a plurality of reciprocating members; means for making a plurality of said compartments fluid tight; means for associating one of said fluid tight compartments with each hydraulic system in such manner that it form a part thereof; resilient means, common to all, urging said reciprocating members to contract said fluid tight compartments; and breather means for compensating the changing positions of said reciprocating members.

11. In a brake having a plurality of hydraulic systems; a device in combination therewith comprising a chamber divided into a plurality of expansible and contractible compartments by a plurality of reciprocating members; means for making a plurality of said compartments fluid tight; means for associating one of said fluid tight compartments with each hydraulic system in such manner that it form a part thereof; resilient means, common to all, urging said reciprocating members to contract said fluid tight compartments; and indicator means for showing the position of each of said reciprocating members, and consequently the quantity of liquid contained in the respective compartments, said indicator means including a slot in the wall of said chamber.

12. In a brake having a plurality of hydraulic systems; a device in combination therewith comprising a chamber divided into a plurality of expansible and contractible compartments by a plurality of reciprocating members; means for making a plurality of said compartments fluid tight; means for associating one of said fluid tight compartments with each hydraulic system in such manner that it form a part thereof; resilient means, common to all, urging said reciprocating members to contract said fluid tight compartments; and indicator means for showing the position of each of said reciprocating members, and consequently the quantity of liquid contained in the respective compartments, said indicator means comprising a slot in the wall of said chamber and a stud, carried by each of said reciprocating members, projecting through said slot.

13. In a brake having a plurality of hydraulic systems; a device associated therewith comprising in combination a chamber divided into a plurality of expansible and contractible compartments by a plurality of reciprocating members; means for making a plurality of said compartments fluid tight; means for associating one of said fluid tight compartments with each hydraulic system in such manner that it form a part thereof; resilient means, common to all, urging said reciprocating members to contract said fluid tight compartments; and means for introducing the operating liquid under pressure into each of said fluid tight compartments against the resistance of said resilient means.

14. In a brake having a plurality of hydraulic systems; a device in combination therewith comprising a chamber divided into a plurality of expansible and contractible compartments by a plurality of reciprocating members; means for making a plurality of said compartments fluid tight; means for associating one of said fluid tight compartments with each hydraulic system in such manner that it form a part thereof; resilient means, common to all, urging said reciprocating members to contract said fluid tight compartments; and bleeder means for expelling air from said fluid tight compartments.

15. In a brake having a plurality of hydraulic systems, each having its own compressor means and valve means associated therewith for closing off the reservoir means during each braking operation; an equalized pressure maintaining reservoir means, self adapting to the quantity of liquid stored therein and variations in its volume due to changes in temperature, comprising in combination, a casing; an enclosed chamber therein; a plurality of reciprocating members operable in said chamber and dividing it into a plurality of compartments; means for making a plurality of said compartments fluid tight; means for associating one of said fluid tight compartments with each hydraulic system so that it normally form a part thereof; engageable means limiting the ranges of said reciprocating members; resilient means whose action is common to all, disposed between and acting upon said reciprocating members, urging them outwardly to the full extent of their respective ranges and still acting upon them; breather means for compensating the changing positions of said reciprocating members; indicator means for showing the position of each of said reciprocating members and consequently the quantity of liquid contained in the respective fluid tight compartments; means for introducing the operating liquid under pressure into each of said fluid tight compartments against the resistance of said resilient means; and bleeder means for expelling air from said fluid tight compartments; all substantially as described.

16. In a brake having a plurality of hydraulic systems, each having its own compressor means and valve means associated therewith for closing off the reservoir means during each braking operation; an equalized pressure maintaining reservoir means, self adaptable to the quantity of liquid stored therein and variations in its volume due to changes in temperature, comprising a cylinder; a plurality of pistons operable therein and dividing said chamber into a plurality of compartments; packing means for making a plurality of said compartments fluid tight; breather means opening the rest of said compartments to the atmosphere; means for associating one of said fluid tight compartments with each hydraulic system so that it form a part thereof; engageable means limiting the ranges of said pistons; resilient means, common to all, disposed between and acting upon said pistons, urging them in opposite directions to the full extent of their respective ranges and still acting upon them; means for introducing the operating liquid under pressure into each of said fluid tight compartments against the resistance of said resilient means; and means for expelling air from said fluid tight compartments; all substantially as described.

17. In a brake having a plurality of hydraulic systems; a pressure equalizing means comprising a casing; an enclosed chamber therein; a plurality of reciprocating members operable in said chamber and dividing it into a plurality of compartments; means for making a plurality of said compartments fluid tight; means opening the rest of said compartments to the atmosphere; means for associating one of said fluid tight compartments with each hydraulic system so that it form a part thereof; engageable means forming the outer limitations of the range in which said reciprocating members operate, said reciprocating members being adapted to also engage each other; resilient means disposed between said reciprocating members and collapsibly containable within recesses therein, acting upon said reciprocating members, urging them in opposite directions to the full extent of their respective ranges and still acting upon them with sufficient force to sustain them against the normal off brakes hydraulic pressure; all substantially as described.

18. In an hydraulic braking system, in combination, a compressor, including a casing and a compression chamber therein, means for associating said compression chamber with said hydraulic system in such manner that it form a part thereof, a compressor piston operable in said compression chamber for building up pressure therein, and means for operating said compressor piston; and a spring pressed piston reservoir, including a casing and a reservoir chamber therein, a reservoir piston slidable in said reservoir chamber and engageable means limiting the range thereof, the diameter of said reservoir piston being greater than the length of its range, said reservoir piston having the effect of dividing said reservoir chamber into a high pressure compartment and a low pressure compartment; means for associating said high pressure compartment with said hydraulic system in such manner that it form a part thereof, means for associating said low pressure compartment with the atmosphere, and a plurality of compression springs disposed to act cooperatively upon said reservoir piston urging it to contract said high pressure compartment; said plurality of compression springs being divided among a plurality of sections of said low pressure compartment, said sections being separated from one another by a piston-like member forming a seat for one end of said springs and having a bearing upon the wall of said low pressure compartment.

MALCOLM L. MASTELLER.